United States Patent
Donner

(10) Patent No.: US 6,612,583 B2
(45) Date of Patent: Sep. 2, 2003

(54) BEARING SEAL

(75) Inventor: Hans-Christian Donner, Karlsfeld (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/916,758

(22) Filed: Jul. 27, 2001

(65) Prior Publication Data
US 2002/0011708 A1 Jan. 31, 2002

(30) Foreign Application Priority Data
Jul. 31, 2000 (DE) .......................... 100 37 150

(51) Int. Cl.[7] .............. F16J 15/32; F16C 33/76
(52) U.S. Cl. .............. 277/563; 277/424; 384/484
(58) Field of Search ................ 277/560, 563, 277/552, 399, 402, 400, 424; 384/480, 484, 486, 147

(56) References Cited

U.S. PATENT DOCUMENTS

| | | | | |
|---|---|---|---|---|
| 2,188,857 A | * | 1/1940 | Chievitz ............... | 277/559 |
| 2,856,208 A | * | 10/1958 | Cobb ................. | 277/369 |
| 3,466,052 A | * | 9/1969 | Ludwig ............... | 277/377 |
| 3,515,395 A | * | 6/1970 | Weinand .............. | 277/559 |
| 3,606,353 A | * | 9/1971 | Heinl ................ | 277/559 |
| 3,729,204 A | * | 4/1973 | Augustin ............. | 277/559 |
| 3,829,104 A | * | 8/1974 | Green ................ | 277/552 |
| 4,765,756 A | * | 8/1988 | Gabelli .............. | 277/348 |
| 4,770,548 A | * | 9/1988 | Otto ................. | 277/552 |
| 4,808,012 A | * | 2/1989 | Otto ................. | 277/348 |
| 5,676,383 A | * | 10/1997 | Chandler ............. | 277/559 |
| 5,722,665 A | * | 3/1998 | Sedy et al. .......... | 277/400 |
| 6,189,896 B1 | * | 2/2001 | Dickey et al. ........ | 277/399 |

FOREIGN PATENT DOCUMENTS

| | | | |
|---|---|---|---|
| DE | 3304623 | | 8/1983 |
| DE | 4215905 | | 11/1993 |
| DE | 19613609 | | 10/1997 |
| DE | 9422236 | | 1/2000 |
| GB | 2261037 A | * | 5/1993 |
| GB | 961522 | | 6/1994 |

* cited by examiner

Primary Examiner—Anthony Knight
Assistant Examiner—Alison K. Pickard
(74) Attorney, Agent, or Firm—Sidley Austin Brown & Wood, LLP

(57) ABSTRACT

A bearing seal with a flat elastic sealing lip (2), positioned between an outer bearing ring (3) and an inner bearing ring (4) with an inner sealing edge (5), sliding circumferentially on the inner bearing ring (4). One surface of the sealing lip (2) facing a lubricant space has radial helical paths formed between members (6) projecting from the surface. The sealing lip slides circumferentially on the inner bearing ring and lubricant flows in the helical paths.

3 Claims, 1 Drawing Sheet

BEARING SEAL

BACKGROUND OF THE INVENTION

The invention relates to a bearing seal, especially for roller bearings, which revolve at high rotational speeds and contain a lubricant, such as an oil or a grease.

The bearings are constructed with bearing seals with respect to the sealing of inner bearing rings, revolving at high rotational speeds and divided into two spaces, separated by a bearing seal, one containing a lubricant, and the other free of the lubricant.

According to U.S. Pat. No. 3,915,519, the shaft, mounted in a friction bearing, has rotational direction-dependent spiral-shaped conveying grooves for the lubricant. These grooves can convey the lubricant into the interior of the bearing. As a result, for the mounting, a hydrodynamic overpressure develops within the friction bearing and, for sealing the bearing, the lubricant constantly is conveyed back into the bearing.

Likewise, a bearing seal, with a sealing edge, revolving by sliding and lying circumferentially on an inner bearing ring, forms at a circular elastic sealing lip, which separates a part, such as a gearing, which is driven along a rotating inner bearing ring filled with oil or grease, and a lubricant-free part, a system with a roller bearing with a roller bearing cage, which is open at one side. Due to the movement of the roller bearing, the lubricant in the bearing is pressed out in the direction of the open side of the roller bearing and spiral flutes, formed depending on the direction of rotation, and convey the lubricant back into the bearing cage and to the sealing edge. Due to the conveying force of the spiral flutes, a local hydrodynamic overpressure of the lubricant may arise in the region of the sealing edge against the pre-stress of the latter, produced by the elastic sealing lip. As a result, the pre-stress of the sealing edge is overcome and consequently a leak of the lubricant develops between the sealing edge and the inner bearing ring.

According to the DE 4215905A1, the sealing lip has radial, spiral knobs at the side of lubricant-containing space. These knobs form a radial, helical path with helical grooves lying in between. Due to the high rotational speed of the inner bearing ring the lubricant is forced hydrodynamically away from an inner radial sealing gap in the direction of an outer bearing ring.

SUMMARY OF THE INVENTION

The primary object of the invention is to provide a simple bearing seal for a bearing, which effects good sealing, as well as adequate lubrication of the bearing, possible even at the high rotational speeds.

Essentially, in the case of a bearing seal, extending between an outer bearing ring and an inner bearing ring, and arranged so that it can rotate about the bearing axis, it has an elastic sealing lip, which slides circumferentially relative to the lubricant space. The surface of the sealing lip facing the lubricant space has radial, helical paths disposed between projecting members, which in the installed state extend circumferentially from the surface of the inner bearing ring. By these means, adequate lubrication at the sealing lip, as well as adequate tightness even at high rotational speeds, is assured.

Advantageously, the height of the projecting members in the axial direction of the bearing increases radially towards the outside. As a result, the conveying of the lubricant is increased further without any decrease in the sealing effect.

Further, to ensure the service life of the sealing edge, the surface of the inner bearing ring contacting the sealing lip has a surface of high quality with respect to smoothness.

Examples of the invention are described in greater detail in the following with reference to the drawing, in which:

DETAILED DESCRIPTION OF THE INVENTION

Figure 1:
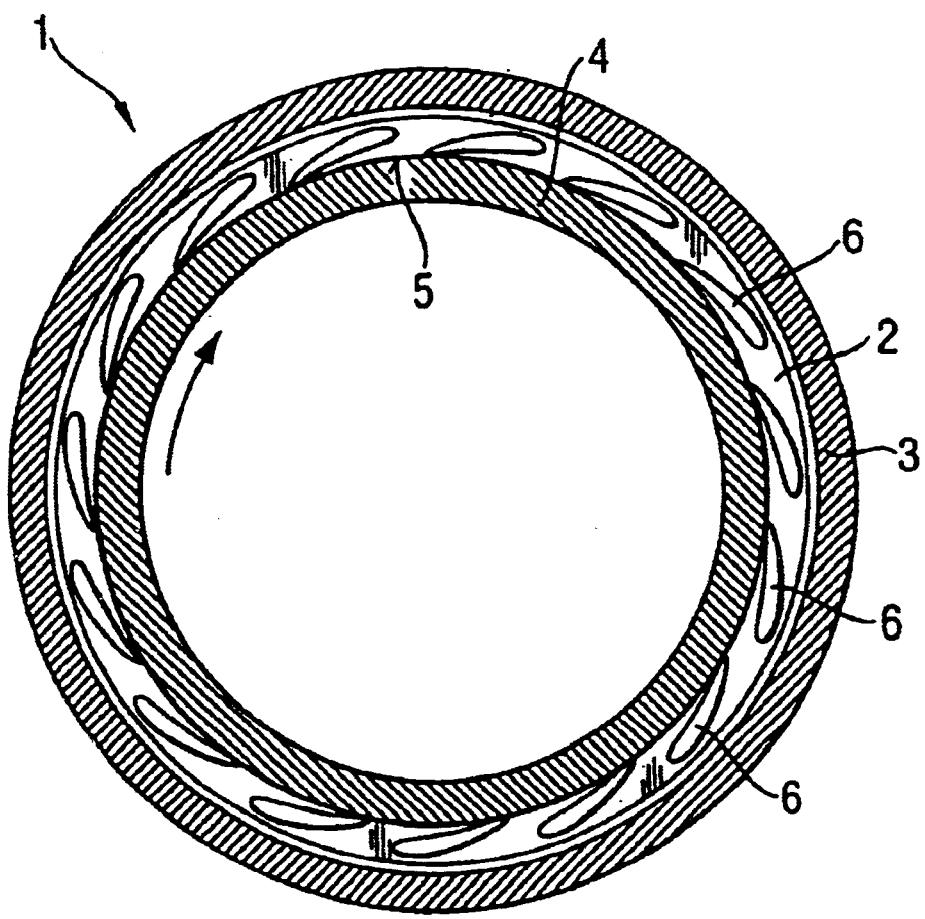
FIG. 1 is a sectional view of a bearing seal embodying the invention.
Figure 2:
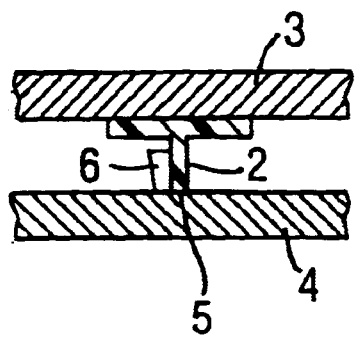
FIG. 2 is a sectional view showing the increasing height of the member extending from the sealing lip.

In FIG. 1, a bearing seal 1 with an elastic sealing lip 2 is positioned between an outer bearing ring 3 and an inner bearing ring 4, mounted so that it can be rotated about the bearing axis. The sealing lip 2, with a sealing edge 5 sliding circumferentially on the inner bearing ring 4, has a surface facing the space containing a lubricant. The surface of the sealing lip 2, shown in FIG. 1, has generally radially and helically extending flow paths located between axially projecting members 6 and in the installed state extend circumferentially on the surface of the inner bearing ring 4 and the height of the projecting members increases radially from the inner bearing ring 4 to the outer bearing ring 3.

What is claimed as new and desired to be protected by letters patent is set forth in the appended claims.

What is claimed is:

1. A bearing seal, for roller bearings, having an axis, and comprising an outer bearing ring (3) encircling said axis, an inner bearing ring (4) spaced inwardly from said outer bearing ring (3) and arranged to rotate about said axis within said outer bearing ring (3) and said inner bearing ring (4) having an outer surface facing said outer ring bearing (3), an annular elastic sealing lip (2) extending radially outwardly from said inner bearing ring (4) to said outer bearing ring (3), said sealing lip (2) having a first surface extending transversely of said axis and arranged to face a lubricant space in the bearing, said sealing lip (2) having a sealing edge (5) sliding circumferentially on said inner bearings ring (4), members (6) arranged on and projecting in the direction of the axis outwardly from the first surface of said sealing lip (2), said members (6) spaced apart in the circumferential direction of said sealing lip and extending, in the installed state, in the circumferential direction from the outer surface of said inner bearing ring (4) and forming lubricant flow paths between adjacent said members with said flow paths having a generally helical flow direction extending circumferentially and radially outwardly from said inner bearing ring to said outer bearing ring.

2. A bearing seal, as set forth in claim 1, wherein said members (6) have a height extending in the direction of said axis increasing from said inner bearing ring (4) toward said outer bearing ring (3).

3. A bearing seal, as set forth in claim 1, wherein the outer surface of said inner bearing ring (4) contacting said sealing edge (5) has a high quality of smoothness.

* * * * *